(12) United States Patent
Yamashita et al.

(10) Patent No.: US 10,483,687 B2
(45) Date of Patent: Nov. 19, 2019

(54) TOLERANCE ABSORBING STRUCTURE OF POWER SUPPLY DISTRIBUTION BOX AND VEHICLE CIRCUIT BODY

(71) Applicants: YAZAKI CORPORATION, Tokyo (JP); TOYOTA JIDOSHA KABUSHIKI KAISHA, Aichi-ken (JP)

(72) Inventors: Toshiaki Yamashita, Shizuoka (JP); Noriaki Sasaki, Shizuoka (JP); Shinji Oshita, Aichi-ken (JP); Hiroki Kawakami, Aichi-ken (JP)

(73) Assignees: YAZAKI CORPORATION, Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/183,694

(22) Filed: Nov. 7, 2018

(65) Prior Publication Data
US 2019/0181584 A1 Jun. 13, 2019

(30) Foreign Application Priority Data
Dec. 11, 2017 (JP) .................................. 2017-237018

(51) Int. Cl.
| | |
|---|---|
| H01R 4/38 | (2006.01) |
| H01R 13/64 | (2006.01) |
| H01R 13/533 | (2006.01) |
| B60R 16/03 | (2006.01) |
| H01R 25/16 | (2006.01) |

(Continued)

(52) U.S. Cl.
CPC ........... *H01R 13/533* (2013.01); *B60R 16/03* (2013.01); *H01R 9/226* (2013.01); *H01R 25/162* (2013.01); *H02G 3/083* (2013.01); *H02G 3/086* (2013.01); *H02G 3/088* (2013.01); *H01R 31/02* (2013.01); *H02G 3/16* (2013.01)

(58) Field of Classification Search
CPC ...... H01R 13/533; H01R 13/52; H01R 9/226; H01R 25/162; H01R 31/02; B60R 16/03; H02G 3/088; H02G 3/086; H02G 3/16
USPC .............................. 439/382, 2, 248, 33, 251
See application file for complete search history.

(56) References Cited

U.S. PATENT DOCUMENTS

| | | | | |
|---|---|---|---|---|
| 3,611,274 A | * | 10/1971 | Low ......................... | F41F 3/055 439/163 |
| 4,227,765 A | * | 10/1980 | Neumann ............... | H01R 24/52 439/248 |

(Continued)

FOREIGN PATENT DOCUMENTS

| | | |
|---|---|---|
| JP | 2004-328952 A | 11/2004 |
| JP | 2012-34550 A | 2/2012 |

*Primary Examiner* — Hae Moon Hyeon
*Assistant Examiner* — Thang H Nguyen
(74) *Attorney, Agent, or Firm* — Kenealy Vaidya LLP

(57) ABSTRACT

A tolerance absorbing structure of a first power supply distribution box includes a connection terminal to which one end part of a flat distribution member is connected and fixed; a storage case including a connection opening member into which the connection terminal is inserted and fixed to a vehicle body; an elastic support member configured to support the connection terminal freely movably in a three-dimensional direction with respect to the connection opening member; and a flexible conductor configured to connect a substrate connection part of a circuit conductor stored in the storage case and the connection terminal with an extra length.

6 Claims, 8 Drawing Sheets

(51) Int. Cl.
*H02G 3/08* (2006.01)
*H01R 9/22* (2006.01)
H01R 31/02 (2006.01)
H02G 3/16 (2006.01)

(56) References Cited

U.S. PATENT DOCUMENTS

| | | | | |
|---|---|---|---|---|
| 4,909,748 | A * | 3/1990 | Kozono | H01R 13/6315 |
| | | | | 439/247 |
| 4,978,313 | A * | 12/1990 | Kameyama | H01R 13/74 |
| | | | | 439/248 |
| 6,065,988 | A * | 5/2000 | Kubota | H01R 12/57 |
| | | | | 439/248 |
| 6,390,841 | B1 * | 5/2002 | Zaguskin | H01R 13/6315 |
| | | | | 439/248 |
| 7,588,449 | B2 * | 9/2009 | Takehara | H01R 13/5219 |
| | | | | 439/247 |
| 2003/0077926 | A1 * | 4/2003 | Terunuma | H01R 9/226 |
| | | | | 439/76.2 |
| 2004/0102079 | A1 * | 5/2004 | Hayes | B60R 13/0225 |
| | | | | 439/404 |
| 2007/0042636 | A1 * | 2/2007 | Yamamoto | B60R 16/0239 |
| | | | | 439/475 |
| 2012/0061369 | A1 * | 3/2012 | Gu | H05B 1/0244 |
| | | | | 219/209 |
| 2018/0118138 | A1 * | 5/2018 | Tsukamoto | H01R 4/34 |
| 2018/0351304 | A1 * | 12/2018 | Miyazawa | H01R 13/6592 |

* cited by examiner

TOLERANCE ABSORBING STRUCTURE OF POWER SUPPLY DISTRIBUTION BOX AND VEHICLE CIRCUIT BODY

CROSS-REFERENCE TO RELATED APPLICATIONS

This application is based on and claims priority under 35 USC 119 from Japanese Patent Application No. 2017-237018 filed on Dec. 11, 2017, the contents of which are incorporated herein by reference.

TECHNICAL FIELD

The present invention relates to a tolerance absorbing structure of a power supply distribution box and a vehicle circuit body.

Inside a vehicle, a battery and an auxiliary machine as well as a power supply distribution module (a power supply distribution box) are disposed. Further, a wire harness (a vehicle circuit body) constituted by electric wires for electrically connecting the battery, the auxiliary machine, and the power supply distribution module is arranged, thereby forming a circuit inside the vehicle (see Patent Document 1).

Further, a connector is provided at an end part of the wire harness, and an electric connection is performed by fitting the connector into a junction block (the power supply distribution box) (see Patent Document 2).

These wire harnesses are in forms of arranging the electric wires on the vehicle, and, for example, absorption of extra lengths of the electric wires between a plurality of the power supply distribution boxes is performed by bending of the electric wires, and the like.

PRIOR ART DOCUMENT

Patent Document

Patent Document 1: JP-A-2012-34550
Patent Document 2: JP-A-2004-328952

SUMMARY OF INVENTION

However, in recent years, a vehicle circuit body using a flat distribution member without using an electric wire has been proposed for a wire harness. Since the flat distribution member has higher rigidity and a deflection amount thereof is smaller in comparison with the electric wire, it is difficult to absorb an extra length and a tolerance. Therefore, there exists a possibility that assembly workability may deteriorate or a connection becomes not possible due to the extra length of the flat distribution member and a tolerance of a conductor connection part of the power supply distribution box. That is, there exists a possibility that all of the flat distribution member and the conductor connection part cannot be connected to each other without high accuracy therebetween. In particular, in the vehicle circuit body using the long flat distribution member, since a possibility that the conductor connection part cannot be connected is further increased when the extra length/tolerance thereof is large, the high assembly accuracy is required, thereby resulting in an increase in manufacturing cost.

The present invention has been made in view of the above-mentioned circumstances, and an object of the present invention is to provide a tolerance absorbing structure of a power supply distribution box and a vehicle circuit body capable of improving assemblability of a flat distribution member.

The object of the present invention is achieved by configurations described below.

(1) A tolerance absorbing structure of a power supply distribution box, including:
a conductor connection member to which one end part of a flat distribution member is connected and fixed;
a storage case that includes a connection opening member into which the conductor connection member is inserted, and fixed to a vehicle body;
an elastic support member that supports the conductor connection member movably in a three-dimensional direction with respect to the connection opening member; and a flexible conductor that connects a substrate connection part of a circuit conductor stored in the storage case and the conductor connection member with an extra length.

According to the tolerance absorbing structure of the power supply distribution box of the above configuration (1), when one end part of the flat distribution member and the conductor connection member of the power supply distribution box are connected and fixed to each other, a load which is caused by a position deviation generated in a range of an extra length and a tolerance of the flat distribution member acts on the conductor connection member connected to one end part of the flat distribution member. At this time, since the conductor connection member is supported by the elastic support member which is elastically deformable by the load acting on the conductor connection member so as to be freely movable in the three-dimensional direction with respect to the connection opening member of the storage case, it is possible to absorb the extra length in an extending direction of the flat distribution member having high rigidity and the position deviation in a plate thickness direction and a width direction.

Further, the substrate connection part of the circuit conductor stored in the storage case and the conductor connection member freely movable in the three-dimensional direction are electrically connected to each other by the flexible conductor having the extra length. The flexible conductor can be freely bent following a movement of the conductor connection member. Therefore, the flexible conductor does not apply excessive stress to a connection part with the substrate connection part and does not cause deterioration in reliability of an electrical connection due to breakage of the connection part therewith, and the like. Therefore, high assembly accuracy is not required.

(2) The tolerance absorbing structure of the power supply distribution box according to the configuration (1), wherein
the conductor connection member is constructed by a connection terminal including an electric connection part to which one end part of the flat distribution member is connected and fixed, and
one end part of the flexible conductor, the other end part of which is connected to the substrate connection part, is connected to the connection terminal.

According to the tolerance absorbing structure of the power supply distribution box of the configuration (2), one end part of the flat distribution member and the electric connection part of the connection terminal are electrically and mechanically connected and fixed to each other by a secure and easy connection mechanism such as, for example, bolt fastening, welding, and the like. Therefore, it is possible to prevent an increase in manufacturing cost caused by deterioration in connection workability.

(3) The tolerance absorbing structure of the power supply distribution box according to the configuration (1), wherein the conductor connection member is constructed by a female terminal including a fitting part to which one end part of the flat distribution member is fitted, and an insulation housing for storing the female terminal, and one end part of the flexible conductor is connected to the female terminal.

According to the tolerance absorbing structure of the power supply distribution box of the configuration (3), one end part of the flat distribution member is fitted to the fitting part of the female terminal and is electrically and mechanically connected and fixed thereto. Therefore, connection work becomes easy, thereby improving the connection workability.

(4) The tolerance absorbing structure of the power supply distribution box according to any one of the configurations (1) to (3), wherein the connection opening member is fixed to a substrate on which the circuit conductor is formed.

According to the tolerance absorbing structure of the power supply distribution box of the configuration (4), the conductor connection member supported by the connection opening member through the elastic support member and the circuit conductor connected to the conductor connection member through the flexible conductor are integrally assembled to the substrate. Accordingly, the power supply distribution box can be assembled only by storing the substrate on which the conductor connection member is assembled in advance in the storage case, thereby improving assembly workability.

(5) The tolerance absorbing structure of the power supply distribution box according to the configuration (2), wherein the elastic support member is constructed by a grommet, the grommet including a large cylindrical part mounted on an opening end of the connection opening member, a small cylindrical part mounted on the connection terminal, and a connection cylindrical part connecting the large cylindrical part and the small cylindrical part.

According to the tolerance absorbing structure of the power supply distribution box of the configuration (5), since the opening end of the connection opening member is closed by the grommet, the power supply distribution box can easily become a waterproof structure.

(6) A vehicle circuit body including:

a first power supply distribution box including a plurality of tolerance absorbing structures of the power supply distribution boxes described in any one of the configuration (1) to (5);

a plurality of second power supply distribution boxes fixed to the vehicle body; and the plurality of flat distribution members, one end parts of which are respectively connected and fixed to the conductor connection members in the first power supply distribution box, and the other end parts of which are respectively connected and fixed to the second power supply distribution boxes.

According to the vehicle circuit body of the configuration (6), after the plurality of second power supply distribution boxes, to which the other end parts of the plurality of flat distribution members are respectively connected, are respectively fixed to the vehicle body, one end parts of the respective flat distribution members are respectively connected to the conductor connection members of the first power supply distribution box, and the first power supply distribution box is fixed to the vehicle body, thereby making it possible to absorb the extra length in the extending direction of each flat distribution member and the position deviation in the plate thickness and the width direction only by the first power supply distribution box. Here, the tolerance absorbing structure is not required to be respectively provided in the plurality of second power supply distribution boxes, thereby preventing a cost increase in the vehicle circuit body.

According to a tolerance absorbing structure of a power supply distribution box and a vehicle circuit body, it is possible to improve assemblability of a flat distribution member.

As described above, the present invention is briefly described. Further, the details of the present invention will be further clarified by reading through a form (hereinafter referred to as "an exemplary embodiment") for performing the invention described hereinafter with reference to the accompanying drawings.

DESCRIPTION OF EMBODIMENTS

Hereinafter, exemplary embodiments according to the present invention will now be described with reference to the drawings.

A vehicle circuit body according to the embodiment of the present invention is used for respectively supplying, for example, electric power of a main power source such as an in-vehicle battery, and the like to auxiliary machines of each part of the vehicle body through a flat distribution member. The flat distribution member, which is a trunk line, is formed in a simple long flat plate shape, and is formed so that various auxiliary machines can be connected to each other through branch wires connected to a plurality of power supply distribution boxes dispersedly disposed in a vehicle.

Figure 1:
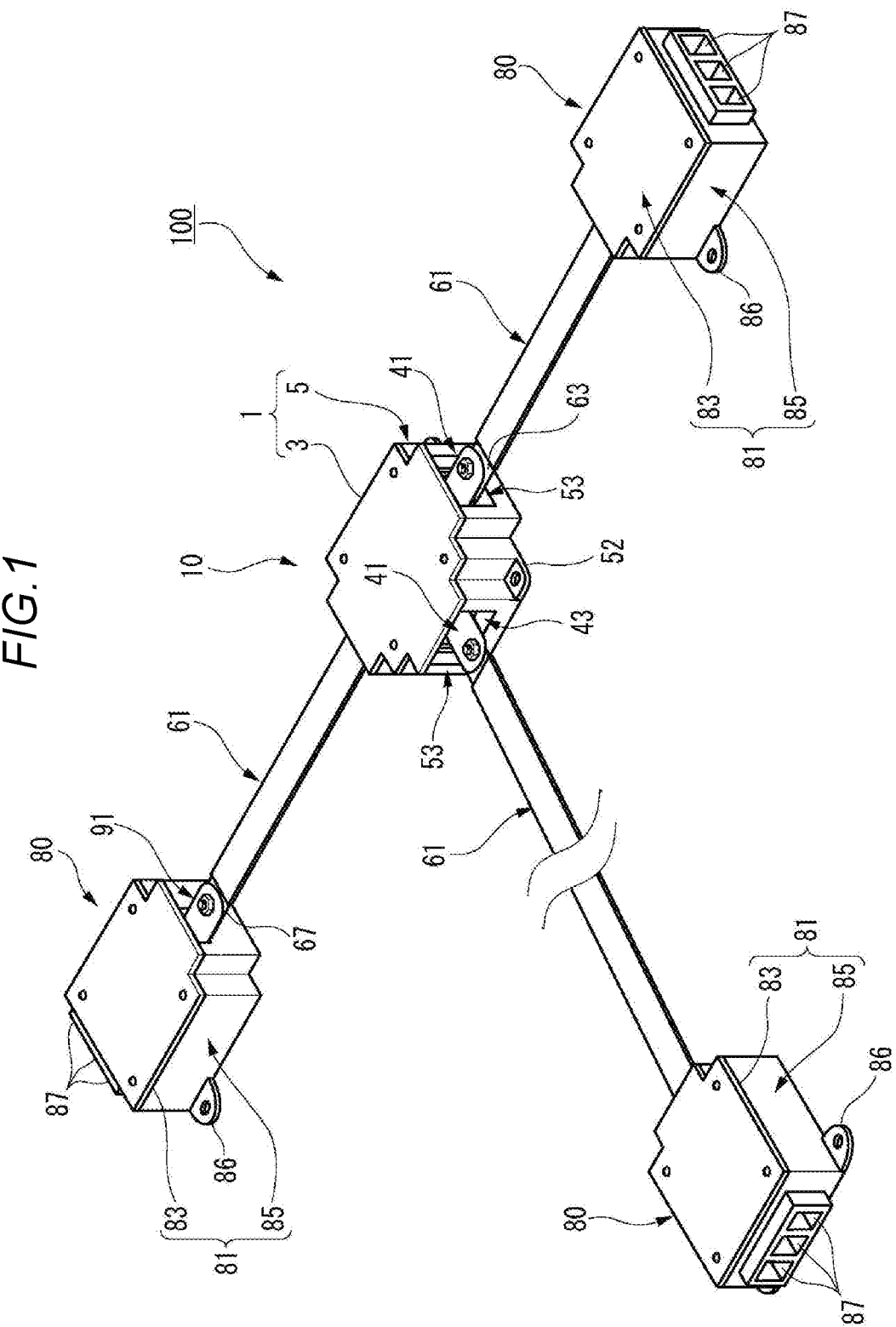
FIG. 1 is a schematic perspective diagram illustrating a vehicle circuit body provided with a tolerance absorbing structure of a power supply distribution box according to a first embodiment of the present invention.
Figure 2:
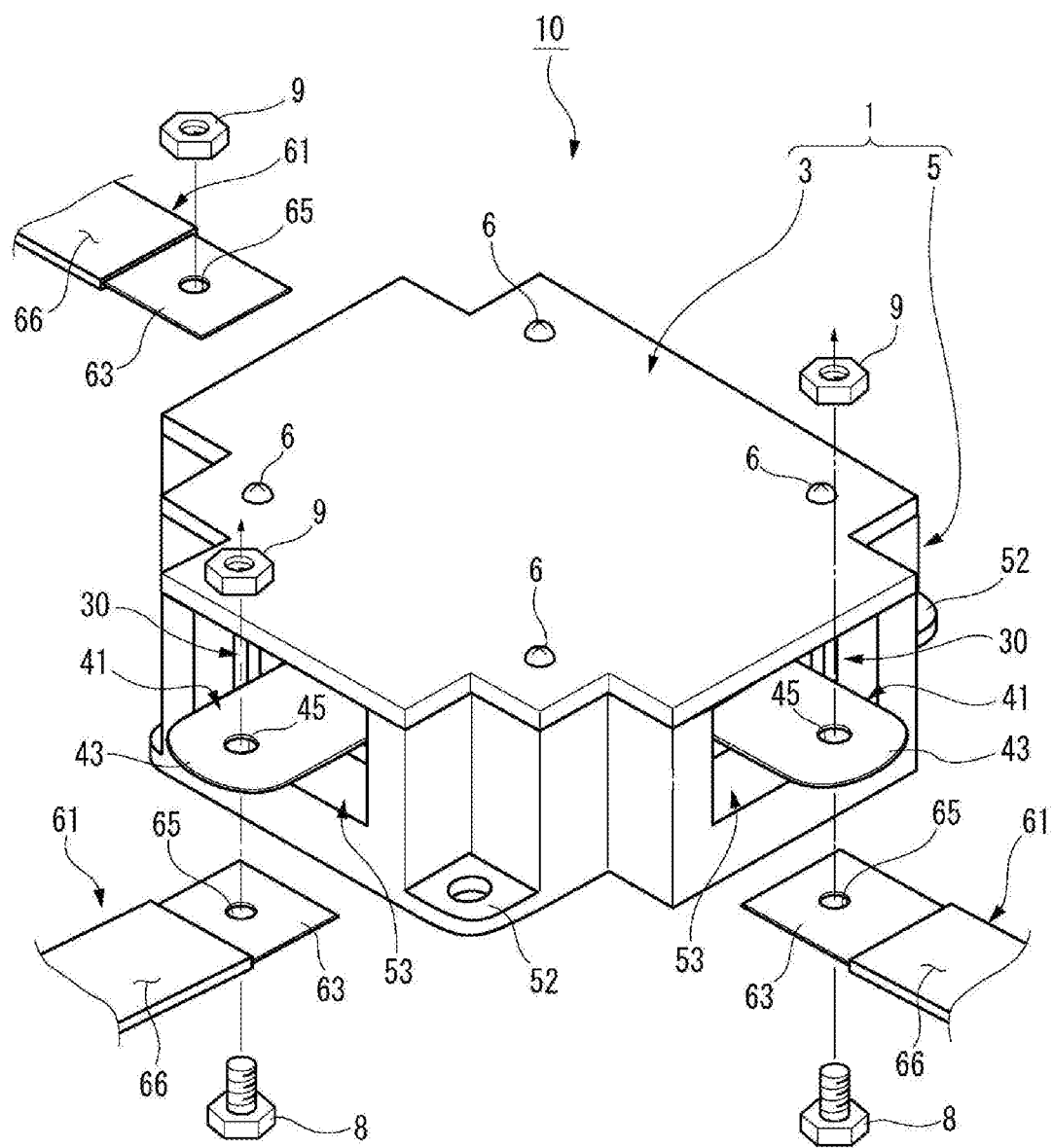
FIG. 2 is a perspective diagram of a first power supply distribution box illustrated in FIG. 1.
Figure 3:
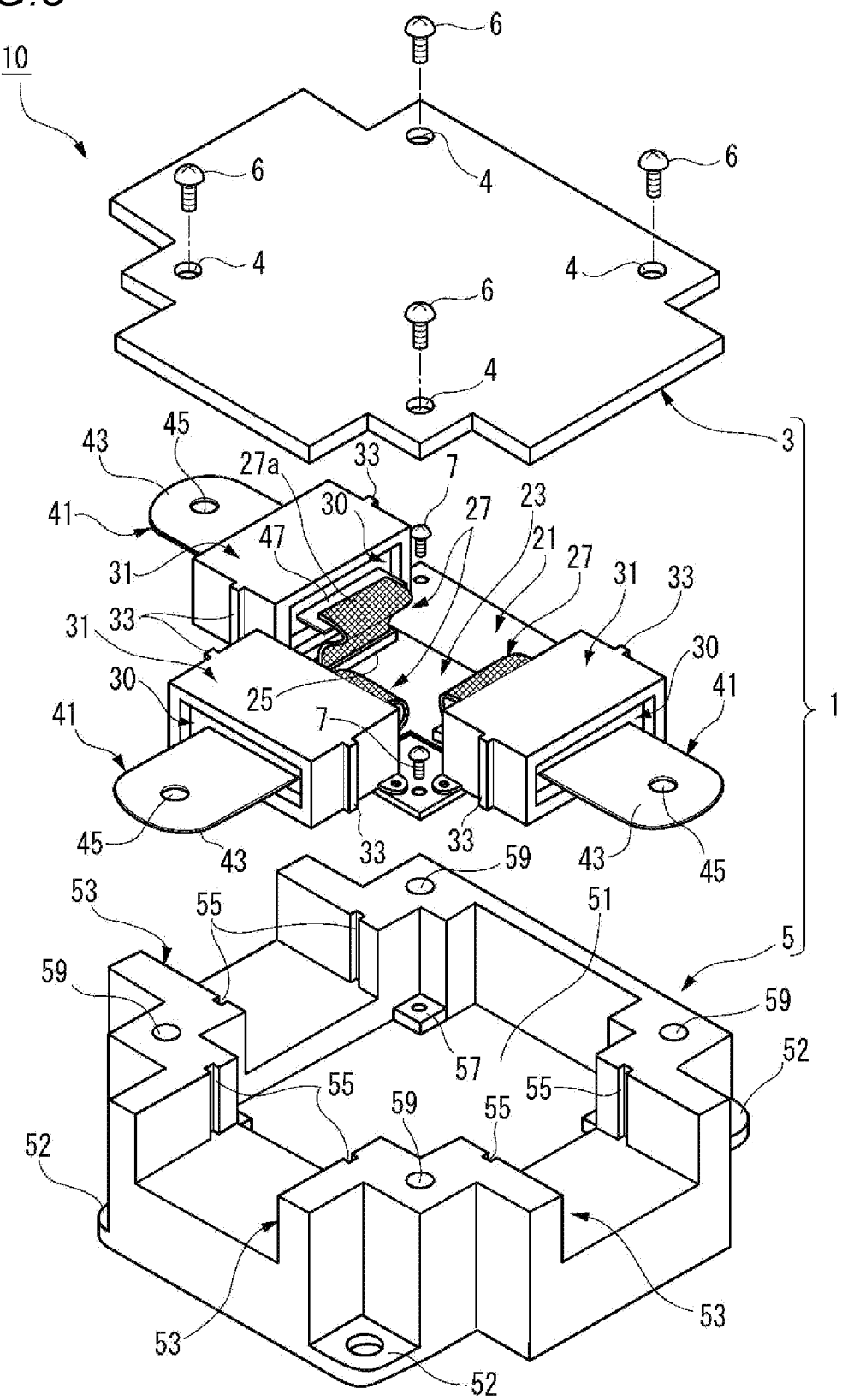
FIG. 3 is an exploded perspective diagram of the first power supply distribution box illustrated in FIG. 2.
Figure 4A:
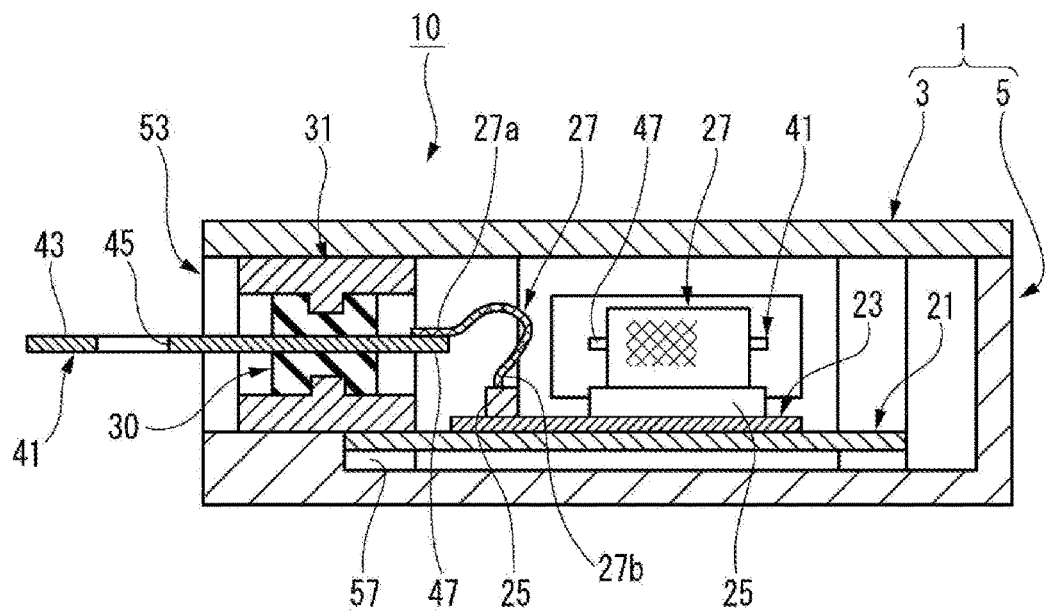
FIG. 4A is a longitudinal sectional diagram of the first power supply distribution box illustrated in FIG. 2.
Figure 4B:
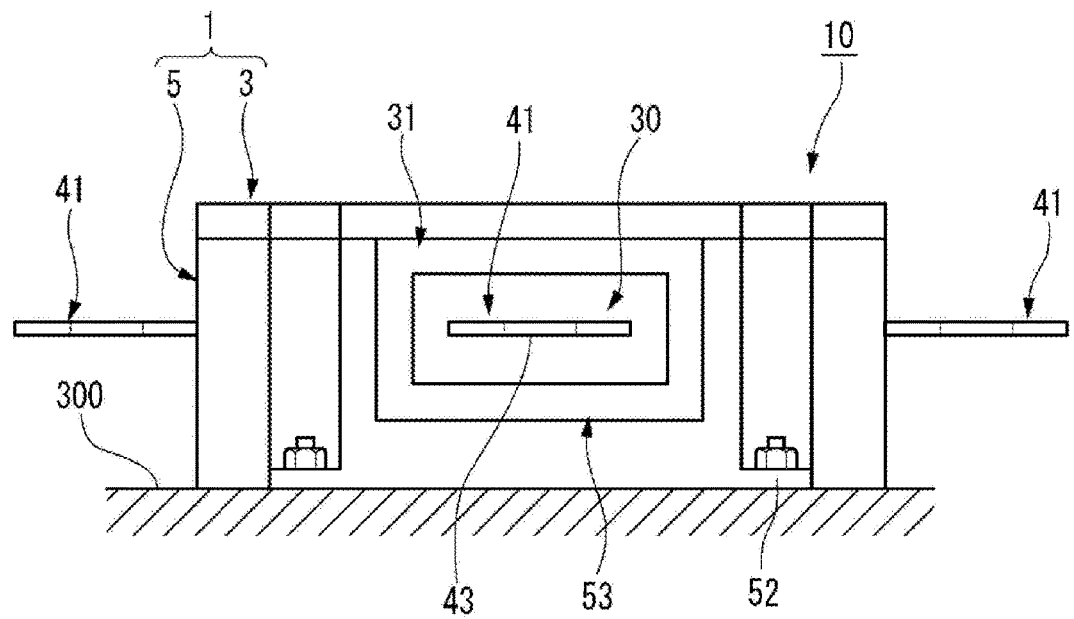
FIG. 4B is a front diagram of the first power supply distribution box illustrated in FIG. 2.

FIG. 1 is a schematic perspective diagram illustrating a vehicle circuit body 100 provided with a tolerance absorbing structure of a power supply distribution box according to a first embodiment of the present invention, FIGS. 2 and 3 are a perspective diagram and an exploded perspective diagram of a first power supply distribution box 10 illustrated in FIG. 1, and FIGS. 4A and 4B are a longitudinal sectional diagram and a front diagram of the first power supply distribution box 10 illustrated in FIG. 2.

As illustrated in FIG. 1, the vehicle circuit body 100 is provided with the first power supply distribution box 10 which includes a plurality of tolerance absorbing structures of the power supply distribution boxes according to the first embodiment and is fixed to a vehicle body 300, a plurality of second power supply distribution boxes 80 (three in the exemplary embodiment) fixed to the vehicle body 300, and a plurality of flat distribution members 61 (three in the exemplary embodiment) in which one end parts 63 thereof are respectively connected and fixed to connection terminals 41 of the first power supply distribution box 10, and the other end parts 67 thereof are respectively connected and fixed to the second power supply distribution boxes 80.

The first power supply distribution box (a power supply distribution box) 10 according to the first embodiment, as illustrated in FIGS. 2 to 4, includes a connection terminal 41 being a conductor connection member, a storage case 1, an elastic support member 30, and a flexible conductor 27. One end part 63 of the flat distribution member 61 is connected and fixed to the connection terminal 41. The storage case 1 includes a connection opening member 31 into which the connection terminal 41 is inserted, and is fixed to the vehicle body 300. The elastic support member 30 supports the connection terminal 41 freely movably in a three-dimensional direction with respect to the connection opening member 31. The flexible connector 27 connects a substrate connection part 25 of a circuit conductor 23 stored in the storage case 1 and the connection terminal 41 with an extra length.

The storage case 1 includes a case main body 5 and a lid 3, and covers a substrate 21 with the case main body 5 and the lid 3. The storage case 1 is formed of a flat approximately hexahedron. A total of the three connection opening parts 53 are formed to protrude from respective side parts at three side parts of the storage case 1. The connection terminals 41 held by the connection opening members 31 which will be described later are disposed in the respective connection opening parts 53.

The connection terminal 41 includes an electric connection part 43, to which one end part 63 of the flat distribution member 61 is connected and fixed, at one end part thereof, and includes a conductor connection part 47, to which one end part 27a of the flexible conductor 27 is welded and connected, at the other end part thereof. A bolt insertion hole 45 is formed in the electric connection part 43.

As illustrated in FIG. 3, the circuit conductor 23 formed of a conductive material having a flat plate shape is formed at a center part of the substrate 21 stored in the storage case 1. Further, the connection opening members 31 are respectively fixed to three side parts of the substrate 21. The substrate 21 is fixed by screws 7 in a state of being placed on a fixing part 57 provided on four corners of a bottom surface 51 of the case main body 5.

The circuit conductor 23 includes three substrate connection parts 25 corresponding to three connection opening parts 53. The other end part 27b of the flexible conductor 27 is fitted and connected to the substrate connection part 25, and the conductor connection part 47 of the corresponding connection terminal 41 is welded and connected to one end part 27a of the flexible conductor 27. Here, the circuit conductor 23 and the three connection terminals 41 are electrically connected to each other. The flexible conductor 27 is formed of a conductor having flexibility, for example, such as a braided wire.

As illustrated in FIGS. 4A and 4B, the connection opening member 31 is formed in a rectangular cylindrical shape having a rectangular opening which is sufficiently large with respect to a thickness and a width of the connection terminal 41. The elastic support member 30 is fitted inside the connection opening member 31.

The elastic support member 30 fitted inside the connection opening member 31 holds an intermediate part of the connection terminal 41 so that the connection terminal 41 is disposed concentrically with a center axis of the connection opening member 31. That is, the electric connection part 43 protrudes from an outer end side of the elastic support member 30, and the conductor connection part 47 protrudes from an inner end side of the elastic support member 30.

The elastic support member 30 is formed of, for example, a flexible rubber bush and is elastically deformable by a load acting on the connection terminal 41. Here, the connection terminal 41 is supported by the elastic support member 30 so as to be freely movable in the three-dimensional direction with respect to the connection opening member 31 of the storage case 1. That is, the first power supply distribution box 10 has a configuration in which each connection terminal 41 is supported by the elastic support member 30 so as to be freely movable in the three-dimensional direction with respect to each of the three connection opening members 31, thereby including three tolerance absorbing structures.

Positioning ribs 33 extending in a thickness direction of the connection terminal 41 are projected on opposite outer side surfaces of the connection opening member 31. Positioning grooves 55 extending in the thickness direction of the connection terminal 41 corresponding to the positioning ribs 33 are recessed on opposite inner side surfaces of the connection opening part 53. Accordingly, when the connection opening member 31 is mounted on the case main body 5 together with the substrate 21, the connection opening member 31 is determined to be positioned and held in the connection opening part 53.

The lid 3 covering an upper opening of the case main body 5 is fixed to the case main body 5 by screwing a fixing screw 6 penetrating a through hole 4 of the lid 3 into a screw hole 59 of the case main body 5. Accordingly, the substrate 21 fixed to the case main body 5 together with the connection opening member 31 is stored in the storage case 1. The storage case 1 is fastened and fixed to the vehicle body 300 by fixing bolts (not illustrated) inserted into mounting brackets 52 provided on an outer side surface of the case main body 5.

One end part 63 of the flat distribution member 61 having high rigidity is electrically and mechanically connected and fixed to the electric connection part 43 of the connection terminal 41 protruding from each connection opening part 53 of the storage case 1.

The flat distribution member 61 is a long flat conductor, and an outer peripheral surface thereof is covered with an insulation coating 66. Bolt insertion holes 65 are respectively formed at one end part 63 and the other end part 67.

Aluminum, an aluminum alloy, copper, a copper alloy, and the like are appropriately used for the flat distribution member 61. The flat distribution member 61 is formed in, for example, a thin strip shape and a rectangular shape in which a cross-sectional shape thereof is orthogonal to the longitudinal direction. In this case, an outer peripheral surface of the flat distribution member 61 is an outer peripheral surface on which upper and lower surfaces except opposite end surfaces in the longitudinal direction and right and left side surfaces are continuous. In the flat distribution member 61, a direction orthogonal to the longitudinal direction becomes a width direction, and a lamination direction becomes a thickness direction. The flat distribution member 61 is formed so that the width dimension is extremely larger than the thickness dimension.

The insulation coating 66 can be formed on the outer peripheral surface of the flat distribution member 61 by powder coating. The power coating mainly has two types such as "an electrostatic coating method (spray coating)" and "a fluid immersion method (immersion coating)".

Further, one end part 63 of the flat distribution member 61 and the electric connection part 43 of the connection terminal 41 are firmly fastened and fixed to each other by screwing a nut 9 into a bolt 8 which is inserted through a bolt insertion hole 65 of one end part 63 and the bolt insertion hole 45 of the electric connection part 43.

As illustrated in FIG. 1, a second power supply distribution box 80 to which the other end part 67 of the flat distribution member 61 is connected is provided with a connection terminal 91 to which the other end part 67 of the flat distribution member 61 is connected and fixed and a storage case 81 for storing a circuit conductor connected to the connection terminal 91.

The storage case 81 includes a case main body 85 and a lid 83, and the case main body 85 and the lid 83 cover the circuit conductor. The storage case 81 is fastened and fixed to the vehicle body 300 by fixing bolts (not illustrated) inserted into mounting brackets 86 provided on an outer side surface of the case main body 85.

A plurality of edge connectors 87 which are conductive to the circuit conductor are disposed on the side edge of the storage case 81. In the second power supply distribution box 80, a connector (not illustrated) of an auxiliary machine side electric wire derived from, for example, the eternal auxiliary machine is fitted to the edge connector 87, and the circuit conductor connected to the connection terminal 91 is electrically connected to the auxiliary machine.

That is, in the second power supply distribution box 80, the connection terminal 91 is connected to the circuit conductor with a simple structure without including the tolerance absorbing structure, and the manufacturing cost is lower than that of the first power supply distribution box 10.

Next, an action of the tolerance absorbing structure of the power supply distribution box according to the first embodiment will be described.

According to the tolerance absorbing structure of the power supply distribution box in the first embodiment, when one end part 63 of the flat distribution member 61 of which the other end part 67 is connected to the connection terminal 91 of the second power supply distribution box 80 and the connection terminal 41 of the first power supply distribution box 10 are fastened by the bolt 8 and the nut 9, thereby being connected and fixed to each other, a load which is caused by a position deviation generated in a range of an extra length and a tolerance of the flat distribution member 61 acts on the connection terminal 41 connected to one end part 63 of the flat distribution member 61. At this time, since the connection terminal 41 is supported by the elastic support member 30 which is elastically deformable by the load acting on the connection terminal 41 so as to be freely movable in the three-dimensional direction with respect to the connection opening member 31 of the storage case 1, it is possible to absorb the extra length in an extending direction of the flat distribution member 61 having the high rigidity and the position deviation in a plate thickness direction and a width direction.

Further, the substrate connection part 25 of the circuit conductor 23 stored in the storage case 1 and the connection terminal 41 freely movable in the three-dimensional direction are electrically connected to each other by the flexible conductor 27 having the extra length. The flexible conductor 27 can be bent following the movement of the connection terminal 41. Therefore, the flexible conductor 27 does not apply excessive stress to a connection part with the substrate connection part 25 and does not cause deterioration in reliability of an electrical connection. Therefore, the vehicle circuit body 100 is not required to have high assembly accuracy.

Further, according to the tolerance absorbing structure of the power supply distribution box according to the first embodiment, one end part 63 of the flat distribution member 61 and the electric connection part 43 of the connection terminal 41 are electrically and mechanically connected and fixed to each other by a secure and easy connection mechanism in which one end part 63 and the electric connection part 43 are fastened by the bolt 8 and the nut 9. Therefore, it is possible to prevent an increase in manufacturing cost caused by deterioration in connection workability.

Further, according to the tolerance absorbing structure of the power supply distribution box according to the first embodiment, the connection terminal 41 supported by the elastic support member 30 with respect to the connection opening member 31 and the circuit conductor 23 connected to the connection terminal 41 through the flexible conductor 27 are integrally assembled to the substrate 21. Accordingly, the first power supply distribution box 10 can be assembled only by storing the substrate 21 on which the connection terminal 41 is assembled in advance in the storage case 1, thereby improving the assembly workability.

Further, according to the vehicle circuit body 100 provided with the tolerance absorbing structure of the power supply distribution box according to the first embodiment, after the three second power supply distribution boxes 80 to which the other end parts 67 of the three flat distribution members 61 are respectively connected are fixed to the vehicle body 300, one end part 63 of each flat distribution member 61 is respectively connected to the connection terminal 41 of the first power supply distribution box 10, and the first power supply distribution box 10 is fixed to the vehicle body 300, whereby it is possible to absorb the extra length in the extending direction of each flat distribution member 61 and the position deviation in the plate thickness direction and the width direction only with the first power supply distribution box 10. Therefore, it is not required to respectively provide the tolerance absorbing structure in each of the three second power supply distribution boxes 80, thereby making it possible to prevent a cost increase in the vehicle circuit body 100.

Figure 5A:
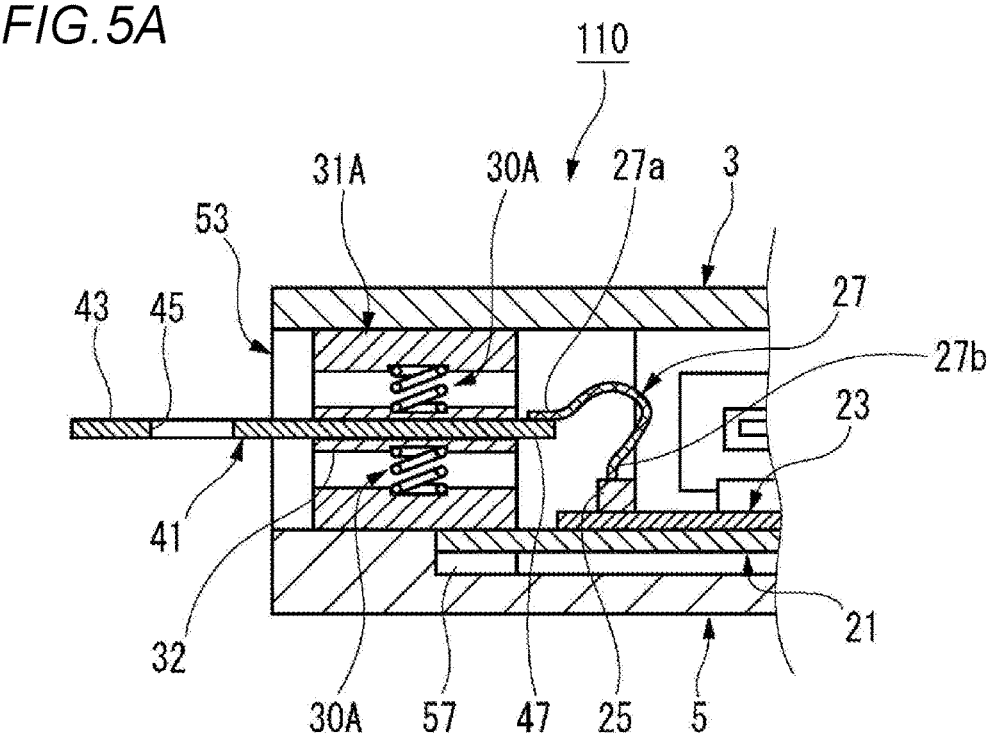
FIGS. 5A and 5B are a longitudinal sectional diagram and a front diagram of a main part of a first power supply distribution box provided with an elastic support member according to a modified example.
Figure 5B:
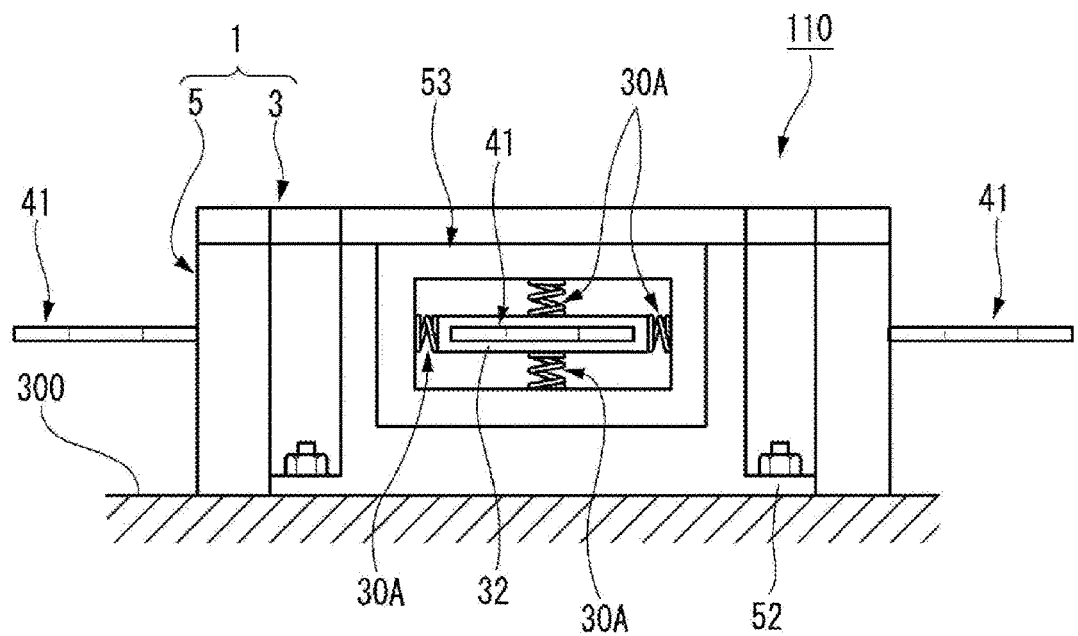

FIGS. 5A and 5B are a longitudinal sectional diagram and a front diagram of a main part of a first power supply distribution box 110 provided with an elastic support member 30A according to a modified example. Further, with respect to the same members as those described in the first power supply distribution box 10 except the elastic support member 30A according to the modified example, the same reference signs will be denoted thereto and redundant descriptions thereof will be omitted.

As illustrated in FIGS. 5A and 5B, the first power supply distribution box 110 is provided with the connection terminal 41 to which one end part 63 of the flat distribution member 61 is connected and fixed, the storage case 1 which includes a connection opening member 31A into which the connection terminal 41 is inserted and is fixed to the vehicle body 300, the elastic support member 30A which supports the connection terminal 41 freely movably in a three-dimensional direction with respect to the connection opening member 31A, and the flexible conductor 27 which connects the substrate connection part 25 of the circuit conductor 23 stored in the storage case 1 and the connection terminal 41 with an extra length.

The connection opening member 31A is formed in a rectangular cylindrical shape having a rectangular opening which is sufficiently large with respect to the thickness and the width of the connection terminal 41. Two pairs of the elastic support members 30A are disposed inside the connection opening member 31A.

Two pairs of the elastic support members 30A disposed inside the connection opening member 31A hold the connection terminal 41 in a state of elastically sandwiching the connection terminal 41 from the thickness direction and the width direction respectively through a terminal housing 32 (an insulation housing) covering an intermediate outer peripheral surface part of the connection terminal 41, so that the connection terminal 41 is disposed concentrically with a center axis of the connection opening member 31A.

The elastic support member 30A is formed of, for example, a compression coil spring. Therefore, the connection terminal 41 is supported by two pairs of the elastic support members 30A which are elastically deformable by the load acting on the connection terminal 41 so as to be freely movable in the three-dimensional direction with respect to the connection opening member 31A of the storage case 1. That is, the first power supply distribution box 110 has a configuration in which each connection terminal 41 is supported by the elastic support members 30A so as to be freely movable in the three-dimensional direction with respect to each of the three connection opening members 31A, thereby having three tolerance absorbing structures.

Therefore, according to the tolerance absorbing structure of the power supply distribution box formed in the first power supply distribution box 110, in the same manner as that of the tolerance absorbing structure of the power supply distribution box according to the first power supply distribution box 10, the connection terminal 41 is supported by two pairs of the elastic support members 30A which are elastically deformable by the load acting on the connection terminal 41 so as to be freely movable in the three-dimensional direction with respect to the connection opening member 31A of the storage case 1. Therefore, the first power supply distribution box 110 can absorb the extra length in the extending direction of the flat distribution member 61 having the high rigidity and the position deviation in the plate thickness direction and the width direction.

Figure 6A:
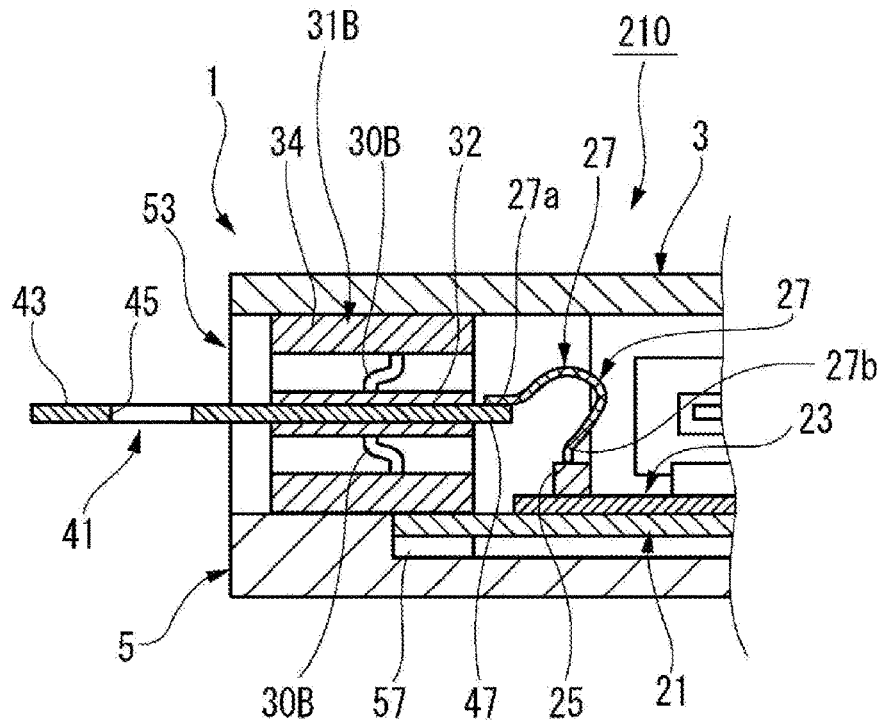
FIGS. 6A and 6B are a longitudinal sectional diagram and a front diagram of a main part of a first power supply distribution box provided with an elastic support member according to another modified example.
Figure 6B:
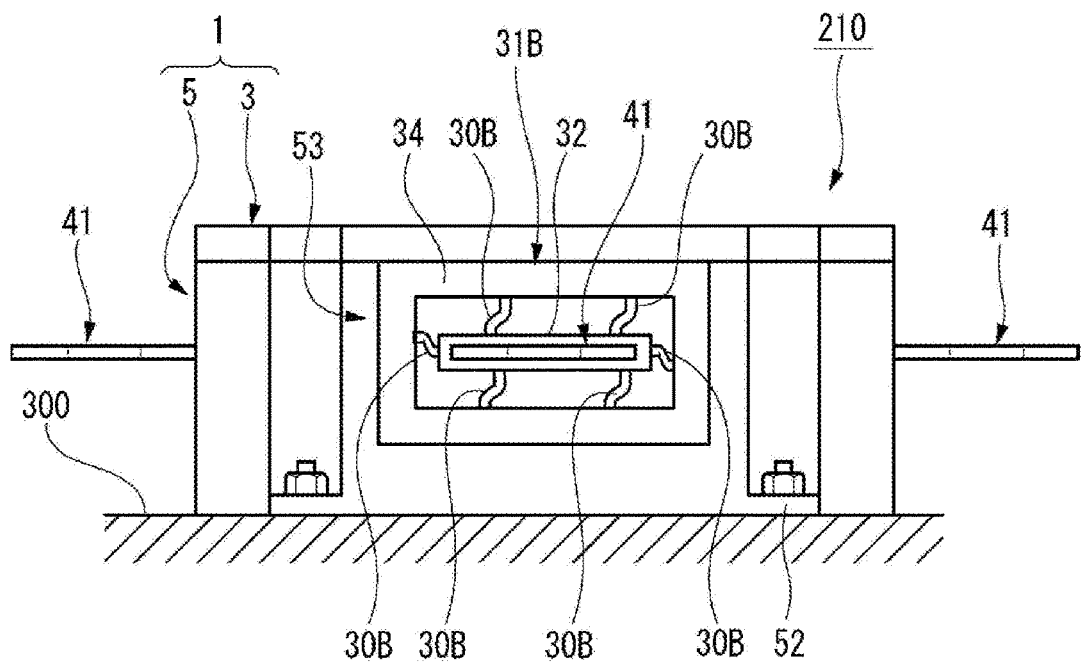

FIGS. 6A and 6B are a longitudinal sectional diagram and a front diagram of a main part of a first power supply distribution box 210 provided with an elastic support member 30B according to another modified example. Further, with respect to the same members as those described in the first power supply distribution box 10 except the elastic support member 30B according to another modified example, the same reference signs will be denoted thereto and redundant descriptions thereof will be omitted.

As illustrated in FIGS. 6A and 6B, the first power supply distribution box 210 is provided with the connection terminal 41 to which one end part 63 of the flat distribution member 61 is connected, the storage case 1 which includes a connection opening member 31B into which the connection terminal 41 is inserted and is fixed to the vehicle body 300, the elastic support member 30B which supports the connection terminal 41 freely movably in a three-dimensional direction with respect to the connection opening member 31B, and the flexible conductor 27 which connects the substrate connection part 25 of the circuit conductor 23 stored in the storage case 1 and the connection terminal 41 with an extra length.

The connection opening member 31B is integrally formed with a housing main body 34 which is formed in a rectangular cylindrical shape having a rectangular opening which is sufficiently large with respect to the thickness and the width of the connection terminal 41, the terminal housing 32 which covers the intermediate outer peripheral surface part of the connection terminal 41, and the six elastic support members 30B which are provided between an inner wall of the housing main body 34 and an outer wall of the terminal housing 32 so that the connection terminal 41 held by the terminal housing 32 is disposed concentrically with a center axis of the housing main body 34.

The elastic support member 30B is formed integrally with, for example, the housing main body 34 and the terminal housing 32, and is formed of a columnar part bent into a spiral shape or a serpentine shape. The six elastic support members 30B are disposed in pairs so that the terminal housing 32 is in a state of being elastically sandwiched from the thickness direction and the width direction of the connection terminal 41 respectively, thereby holding the connection terminal 41.

Here, the connection terminal 41 is supported by the six elastic support members 30B which are elastically deformable by the load acting on the connection terminal 41 so as to be freely movable in a three-dimensional direction with respect to the housing main body 34 of the connection opening member 31B. That is, the first power supply distribution box 210 has a configuration in which each connection terminal 41 is supported by the elastic support members 30B so as to be freely movable in the three-dimensional direction with respect to the housing main body 34 of each of the three connection opening members 31B, thereby having three tolerance absorbing structures.

Therefore, according to the tolerance absorbing structure of the power supply distribution box formed in the first power supply distribution box 210, in the same manner as that of the tolerance absorbing structure of the power supply distribution box according to the first power supply distribution box 10, the connection terminal 41 is supported by the six elastic support members 30B which are elastically deformable by the load acting on the connection terminal 41 so as to be freely movable in the three-dimensional direction with respect to the housing main body 34 of the connection opening member 31B. Therefore, the first power supply distribution box 210 can absorb the extra length in the extending direction of the flat distribution member 61 having the high rigidity and the position deviation in the plate thickness direction and the width direction.

Figure 7A:
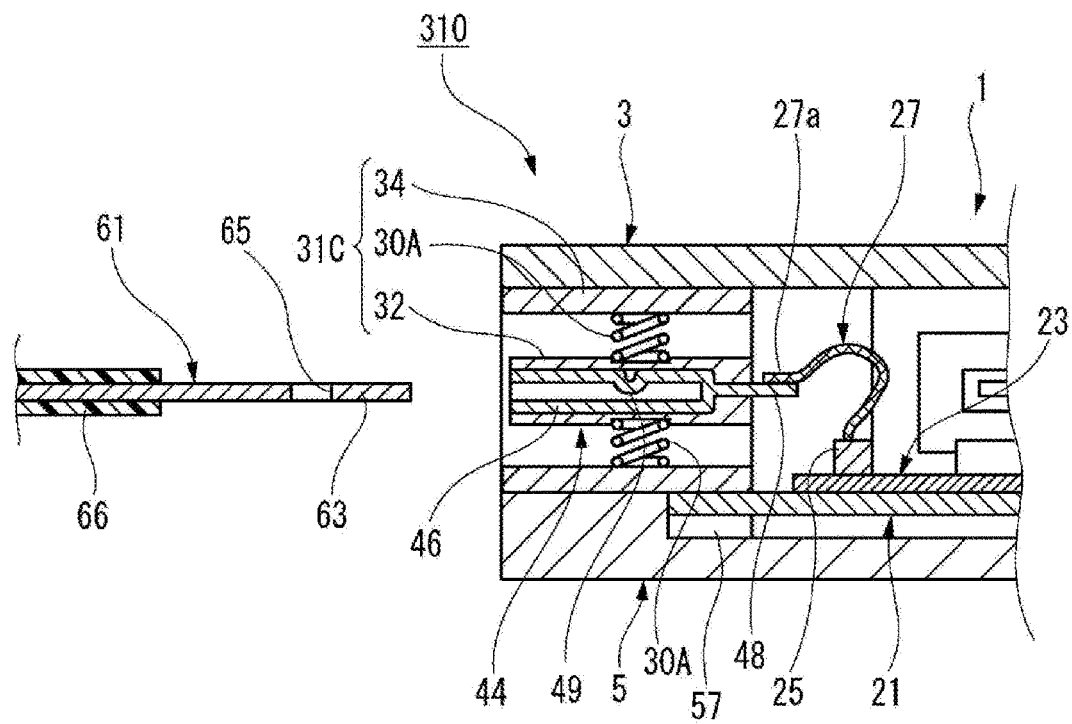
FIGS. 7A and 7B are a longitudinal sectional diagram and a front diagram of a main part of a first power supply distribution box provided with a tolerance absorbing structure of a power supply distribution box according to a second embodiment of the present invention.
Figure 7B:
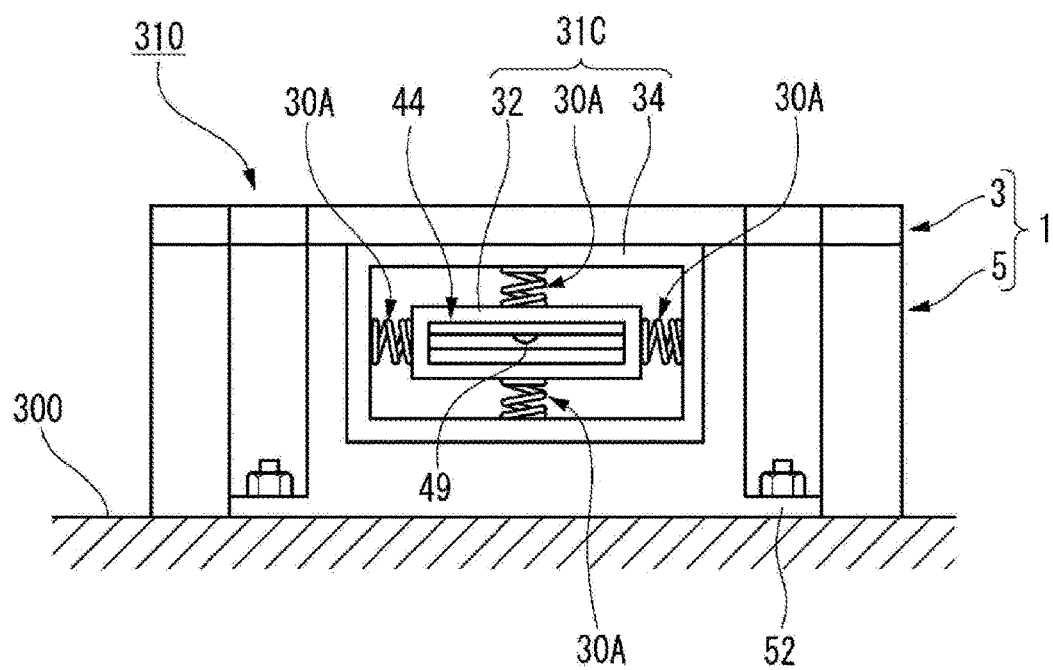

FIGS. 7A and 7B are a longitudinal sectional diagram and a front diagram of a main part of a first power supply distribution box 310 provided with a tolerance absorbing structure of a power supply distribution box according to a second embodiment of the present invention. Further, with respect to the same members as those described in the first power supply distribution box 10, the same reference signs will be denoted thereto and redundant descriptions thereof will be omitted.

As illustrated in FIGS. 7A and 7B, the first power supply distribution box 310 is provided with a female terminal 44 including a fitting part 46 to which one end part 63 of the flat distribution member 61 is fitted, the storage case 1 which includes a connection opening member 31C into which the female terminal 44 is inserted and is fixed to the vehicle body 300, the elastic support member 30A which supports the female terminal 44 freely movably in a three-dimensional direction with respect to the connection opening member 31C, and the flexible conductor 27 which connects the substrate connection part 25 of the circuit conductor 23 stored in the storage case 1 and the female terminal 44 with an extra length.

The female terminal 44 includes the fitting part 46 to which one end part 63 of the flat distribution member 61 is fitted at one end part thereof and a conductor connection part 48 to which one end part 27a of the flexible conductor 27 is welded and connected at the other end part thereof. On an inner wall surface of the fitting part 46, an engagement protrusion 49 to be engaged with the bolt insertion hole 65 of the flat distribution member 61 protrudes.

The connection opening member 31C is formed in a rectangular cylindrical shape having a rectangular opening which is sufficiently large with respect to a thickness and a width of the female terminal 44. Two pairs of the elastic support members 30A are disposed inside the connection opening member 31C.

Two pairs of the elastic support members 30A disposed inside the connection opening member 31C hold the female terminal 44 in a state of elastically sandwiching the female terminal 44 from the thickness direction and the width direction respectively through the terminal housing 32 covering an outer peripheral surface part of the female terminal 44, so that the female terminal 44 is disposed concentrically with a center axis of the connection opening member 31C. The conductor connection part 48 of the female terminal 44 protrudes from an inner end side of the terminal housing 32.

That is, the female terminal 44 is supported by two pairs of the elastic support members 30A which are elastically deformable by a load acting on the female terminal 44 so as to be freely movable in the three-dimensional direction with respect to the connection opening member 31C of the storage case 1. That is, the first power supply distribution box 310 has a configuration in which each of the female terminals 44 is supported by the elastic support members 30A so as to be freely movable in the three-dimensional direction with respect to each of the three connection opening members 31C, thereby having three tolerance absorbing structures.

Therefore, according to the tolerance absorbing structure of the power supply distribution box formed in the first power supply distribution box 310 in the second embodiment, in the same manner as that of the tolerance absorbing structure of the power supply distribution box according to the first power supply distribution box 10, the female terminal 44 is supported by two pairs of the elastic support members 30A which are elastically deformable by the load acting on the female terminal 44 so as to be freely movable in the three-dimensional direction with respect to the connection opening member 31C of the storage case 1. Therefore, the first power supply distribution box 310 can absorb the extra length in the extending direction of the flat distribution member 61 having the high rigidity and the position deviation in the plate thickness direction and the width direction.

Further, one end part 63 of the flat distribution member 61 is fitted to the fitting part 46 of the female terminal 44 and is electrically and mechanically connected and fixed thereto. Accordingly, in a vehicle circuit body provided with the tolerance absorbing structure of the power supply distribution box according to the second embodiment, connection work becomes easy, thereby improving connection work efficiency.

Figure 8:
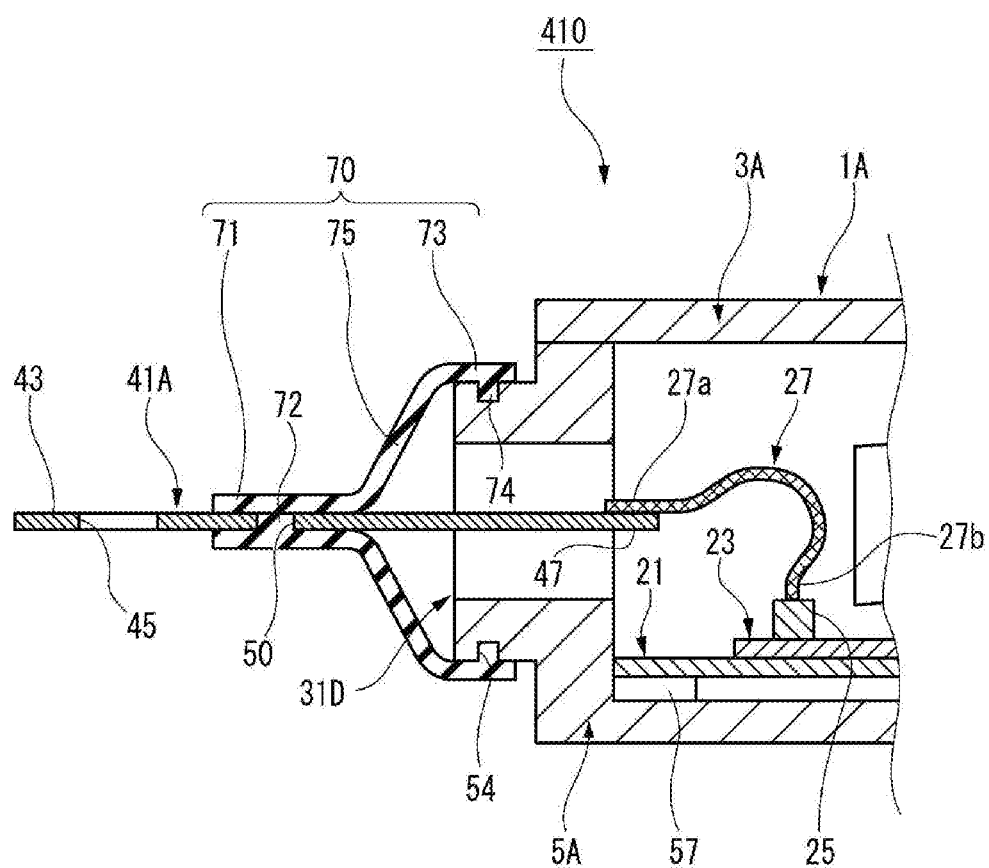
FIG. 8 is a longitudinal sectional diagram of a main part of a first power supply distribution box provided with a tolerance absorbing structure of a power supply distribution box according to a third embodiment of the present invention.

FIG. 8 is a longitudinal sectional diagram of a main part of a first power supply distribution box 410 provided with a tolerance absorbing structure of a power supply distribution box according to a third embodiment of the present invention. Further, with respect to the same members as those described in the first power supply distribution box 10, the same reference signs will be denoted thereto and redundant descriptions thereof will be omitted.

As illustrated in FIG. 8, the first power supply distribution box 410 is provided with a connection terminal 41A to which one end part 63 of the flat distribution member 61 is connected and fixed, a storage case 1A which includes a connection opening member 31D into which the connection terminal 41A is inserted and is fixed to the vehicle body 300, an elastic support member 70 which supports the connection terminal 41A freely movably in a three-dimensional direction with respect to the connection opening member 31D, and the flexible conductor 27 which connects the substrate connection part 25 of the circuit conductor 23 stored in the storage case 1A and the connection terminal 41A with an extra length.

The storage case 1A includes a case main body 5A and a lid 3A, and covers the substrate 21 with the case main body 5A and the lid 3A. The storage case 1A is formed of a flat approximately hexahedron. A total of the three connection opening members 31D are formed to protrude from respective side parts at three side parts of the storage case 1A. The connection terminal 41A held by the elastic support member 70 which will be described later is disposed in each of the connection opening members 31D.

The connection terminal 41A includes the electric connection part 43, to which one end part 63 of the flat distribution member 61 is connected and fixed, at one end part thereof and the conductor connection part 47, to which one end part 27a of the flexible conductor 27 is welded and connected, at the other end part thereof. A locking hole 50 is formed between the bolt insertion hole 45 and the conductor connection part 47 in the electric connection part 43.

The connection opening member 31D is formed in a rectangular cylindrical shape having a rectangular opening which is sufficiently large with respect to a thickness and a width of the connection terminal 41A, and is integrally formed with the case main body 5A. A peripheral groove 54 is recessed on an outer peripheral surface of the connection opening member 31D. Further, the connection opening member 31D may not be integrally formed with the case main body 5A. Alternatively, the connection opening member 31D formed separately may be disposed in the connection opening part 53 provided in the case main body 5A.

The elastic support member 70 is formed of a grommet including a large cylindrical part 73 mounted on an opening end of the connection opening member 31D, a small cylindrical part 71 mounted on the connection terminal 41A, and a connection cylindrical part 75 connecting the large cylindrical part 73 and the small cylindrical part 71.

An annular rib 74 fitted into the peripheral groove 54 of the connection opening member 31D is projected on an inner peripheral surface of the large cylindrical part 73. A locking protrusion 72 locked into a locking hole 50 of the connection terminal 41A is projected on an inner surface of the small cylindrical part 71.

The elastic support member 70 is elastically deformable by a load acting on the connection terminal 41A. Therefore, the connection terminal 41A is supported by the elastic support member 70 so as to be freely movable in the three-dimensional direction with respect to the connection opening member 31D of the storage case 1A. That is, the first power supply distribution box 410 has a configuration in which each connection terminal 41A is supported by the elastic support member 70 so as to be freely movable in the three-dimensional direction with respect to each of the three connection opening members 31D, thereby having three tolerance absorbing structures.

Further, in the first power supply distribution box 410 according to the third embodiment, since the opening end of the connection opening member 31D is closed by the elastic support member 70 formed by the grommet, the first power supply distribution box 410 can easily become a waterproof structure.

Accordingly, according to the first power supply distribution boxes 10, 110, 210, 310, and 410 provided with the tolerance absorbing structure of the power supply distribution box in the exemplary embodiments and the vehicle circuit body 100, assemblability of the flat distribution member 61 can be improved.

The present invention is not limited to the above-mentioned exemplary embodiments, but is also intended to be modified and applied by those skilled in the art based upon a mutual combination of respective configurations in the exemplary embodiments, description in the specification, and a well-known technique, which is included in the scope of protection.

For example, the power supply distribution box of the aforementioned configuration describes a case in which the flat plate part is a rectangular shape as an example, but the shape of the flat plate part is not limited thereto and may be a polygon such as a triangle, a pentagon, a hexagon, an octagon, and the like as well as a circular shape, an oval shape, and an elliptic shape.

Here, characteristics of the exemplary embodiments of the tolerance absorbing structure of the power supply distribution box and the vehicle circuit body according to the present invention described above will be briefly described as follows from [1] to [6], respectively.

[1] The tolerance absorbing structure of a power supply distribution box, including:

a conductor connection member (connection terminals 41 and 41A, and a female terminal 44) to which one end part (63) of a flat distribution member (61) is connected and fixed;

a storage case (1 or 1A) that includes connection opening members (31, 31A, 31B, 31C, and 31D) into which the conductor connection member is inserted and fixed to a vehicle body (300);

elastic support members (30, 30A, 30B, and 70) that supports the conductor connection member freely movably in a three-dimensional direction with respect to the connection opening member; and a flexible conductor (27) that connects a substrate connection part (25) of a circuit conductor (23) stored in the storage case and the conductor connection member with an extra length.

[2] The tolerance absorbing structure of the power supply distribution box according to the configuration [1], wherein the conductor connection member is formed as a connection terminal (41) including an electric connection part (43) to which one end part of the flat distribution member is connected and fixed, and one end part (27*a*) of the flexible conductor, the other end part of which is connected to the substrate connection part, is connected to the connection terminal.

[3] The tolerance absorbing structure of the power supply distribution box according to the configuration [1], wherein the conductor connection member is formed of a female terminal (44) including a fitting part (46) to which one end part of the flat distribution member is fitted, and an insulation housing (a terminal housing 32) for storing the female terminal, and one end part (27*a*) of the flexible conductor is connected to the female terminal.

[4] The tolerance absorbing structure of the power supply distribution box according to any one of the configurations [1] to [3], wherein the connection opening member is fixed to a substrate (21) on which the circuit conductor is formed.

[5] The tolerance absorbing structure of the power supply distribution box according to the configuration [2], wherein the elastic support member (70) is formed of a grommet including a large cylindrical part (73) mounted on an opening end of the connection opening member (31D), a small cylindrical part (71) mounted on the connection terminal (41A), and a connection cylindrical part (75) connecting the large cylindrical part and the small cylindrical part.

[6] A vehicle circuit body (100), including: a first power supply distribution box (10) including a plurality of tolerance absorbing structures of the power supply distribution boxes according to any one of the configurations [1] to [5];

a plurality of second power supply distribution boxes (80) fixed to the vehicle body; and the plurality of flat distribution members (61), one end parts (63) of which are respectively electrically connected to the conductor connection members (the connection terminal 41) in the first power supply distribution box, and the other end parts (67) of which are respectively connected and fixed to the second power supply distribution boxes.

What is claimed is:

1. A tolerance absorbing structure of a power supply distribution box, comprising:

a conductor connection member to which one end part of a flat distribution member is connected and fixed;

a storage case that includes a connection opening member into which the conductor connection member is inserted, and fixed to a vehicle body;

an elastic support member that supports the conductor connection member movably in a three-dimensional direction with respect to the connection opening member; and a flexible conductor that connects a substrate connection part of a circuit conductor stored in the storage case and the conductor connection member with an extra length.

2. The tolerance absorbing structure of the power supply distribution box according to claim 1, wherein the conductor connection member is constructed by a connection terminal including an electric connection part to which one end part of the flat distribution member is connected and fixed, and one end part of the flexible conductor, the other end part of which is connected to the substrate connection part, is connected to the connection terminal.

3. The tolerance absorbing structure of the power supply distribution box according to claim 1, wherein the conductor connection member is constructed by a female terminal including a fitting part to which one end part of the flat distribution member is fitted, and an insulation housing for storing the female terminal, and one end part of the flexible conductor is connected to the female terminal.

4. The tolerance absorbing structure of the power supply distribution box according to claim 1, wherein
the connection opening member is fixed to a substrate on which the circuit conductor is formed.

5. The tolerance absorbing structure of the power supply distribution box according to claim 2, wherein
the elastic support member is constructed by a grommet, the grommet including a large cylindrical part mounted on an opening end of the connection opening member, a small cylindrical part mounted on the connection terminal, and a connection cylindrical part connecting the large cylindrical part and the small cylindrical part.

6. A vehicle circuit body comprising:
a first power supply distribution box including a plurality of tolerance absorbing structures of the power supply distribution boxes described in claim 1;
a plurality of second power supply distribution boxes fixed to the vehicle body; and
the plurality of flat distribution members, one end parts of which are respectively connected and fixed to the conductor connection members in the first power supply distribution box, and the other end parts of which are respectively connected and fixed to the second power supply distribution boxes.

* * * * *